US006751742B1

(12) United States Patent
Duhault et al.

(10) Patent No.: US 6,751,742 B1
(45) Date of Patent: Jun. 15, 2004

(54) SYSTEM FOR RESPONDING TO A POWER SAVING MODE AND METHOD THEREOF

(75) Inventors: James Duhault, Toronto (CA); Tsang Fai Ma, Scarborough (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/387,535

(22) Filed: Aug. 31, 1999

(51) Int. Cl.$^7$ .............................. G06F 1/26; G06F 1/28; G06F 1/30
(52) U.S. Cl. ..................... 713/323; 713/300; 713/320; 713/324; 713/340
(58) Field of Search ..................... 713/330, 300, 713/320, 360, 323, 324, 340

(56) References Cited

U.S. PATENT DOCUMENTS

| | | | | |
|---|---|---|---|---|
| 5,471,625 A | * | 11/1995 | Mussemann et al. | 713/323 |
| 5,560,022 A | * | 9/1996 | Dunstan et al. | 713/300 |
| 5,579,466 A | * | 11/1996 | Habib et al. | 345/781 |
| 5,638,541 A | * | 6/1997 | Sadashivaiah | 713/323 |
| 5,944,829 A | * | 8/1999 | Shimoda | 713/324 |
| 5,958,054 A | * | 9/1999 | O'Connor et al. | 713/300 |
| 6,378,076 B1 | * | 4/2002 | Qureshi | 713/322 |

FOREIGN PATENT DOCUMENTS

| | | | | |
|---|---|---|---|---|
| JP | | 10091576 A | * 4/1998 | G06F/13/36 |

OTHER PUBLICATIONS

Lu, Y.–H.; Simunic, T.; De Micheli, G.; "Software controlled power management", Hardware/Software Codesign, 1999. (CODES '99) Proceedings of the Seventh International Workshop on, May 3–5, 1999, pp. 157–161.*

* cited by examiner

Primary Examiner—Thomas Lee
Assistant Examiner—James K. Trujillo
(74) Attorney, Agent, or Firm—Vedder, Price, Kaufman & Kammholz, P.C.

(57) ABSTRACT

In one embodiment of the present invention, an application responds to a low power operation request based upon its current state. In another mode, the application responds based upon its own current state and the state of a second application. Examples of such low power application requests include a suspend operation request issued by an operating system. Examples of such applications include multi-media applications.

19 Claims, 6 Drawing Sheets

SYSTEM FOR RESPONDING TO A POWER SAVING MODE AND METHOD THEREOF

FIELD OF THE INVENTION

The present invention relates generally to computer systems, and more specifically to a system for responding to a power saving mode.

BACKGROUND OF THE INVENTION

In computer systems, it is desirable to have power saving modes, including a power down mode of operation. Such an operation may be executed at the request of a user, a timing device, or any other means capable of requesting a low power mode. The low power request is generally handled by the computer's operating system. However, it is generally desirable to gracefully enter low power mode in order to avoid terminating applications abruptly, whereby information would be lost.

In order to gracefully enter low power mode, the operating system checks with each of the open applications prior to performing a low power operation. Generally, an operating system will issue a suspend request to each open application in order to determine whether or not it is permissible to stop the applications operation.

Upon receiving a suspend, or low power operation request, an application will respond in one of two manners. In a first manner, a fixed response is provided to the operating system. For example, the application can be written such that any suspend request by the operating system will be accepted or denied. In a second manner of operation, the suspend operation request results in a query to the user to determine how to respond to the system. Generally, the query is in the form of a dialog box, whereby a user is asked to indicate whether or not to continue operation of the present application.

The prior art method of responding to suspend, or low power operations, is not flexible, only fixed responses and user provided responses can be handled by the application being queried. This creates a problem for application designers in that there may be only certain times during which it is desirable to select a specific mode of operation. This results in applications and the operating system performing in a non-optimal manner.

Likewise, requiring a user input in order to determine how to handle a suspend, or low power operation is disadvantageous, in that it requires the attention of the user. In situations where the user is not available, the computer system will either wait for the user input, or in the alternative, be forced to act in a fixed manner if no input is provided.

Therefore, a method and apparatus capable of providing more flexibility to respond to power management modes or requests, would be desirable.

DETAILED DESCRIPTION OF THE DRAWINGS

The present invention responds to a low power operation or request, such as a suspend operation notice, based upon the current state of an application receiving the suspend notice. Based upon the application state, an appropriate response is provided to the system. In another embodiment, the response to the suspend request is based upon states of two or more applications.

Figure 1:
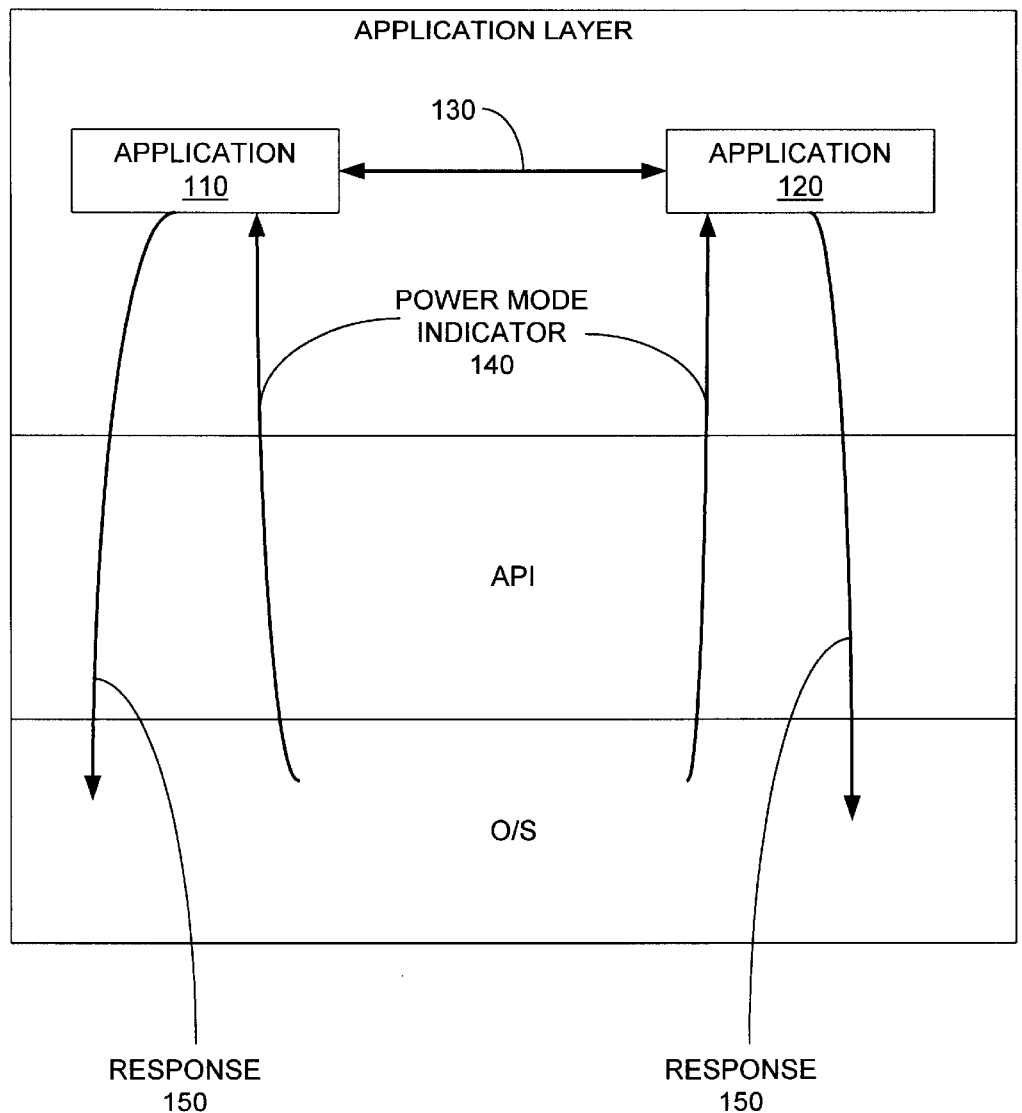
FIG. 1 illustrates a block diagram representing various layers of code typically stored with a memory associated with a computer system.

FIG. 1 is a block diagram illustrating layers of code typically utilized by a host computer when interfacing to applications. An operating system labeled O/S represents any of a number of commercially or proprietary operating systems capable of executing applications. Examples of such operating systems include UNIX, Microsoft products such as Windows 95, Windows 98, as well as the various operating systems provided by Apple Computer. The O/S interfaces at a lower level with the microcode of a specific hardware processor (not illustrated).

At a higher level, the O/S interfaces to an application interface layer (API) which provides midlevel functionality support between the operating system and applications. Illustrated in FIG. 1 as the top layer, is an application layer. The application layer is where applications reside, for example applications 110 and 120. It will be apparent to one of ordinary skill in the art, that the layers of code illustrated in FIG. 1 represent a simplification. For example, multiple API layers may be implemented, as well as varying layers of support below the O/S. However, for purposes of illustration, the API can act as a general interface between the operating system and the application layer. As illustrated by the power mode indicators 140 of FIG. 1, the operating system can provide requests and information directly to the applications residing at the application layer.

Figure 2:
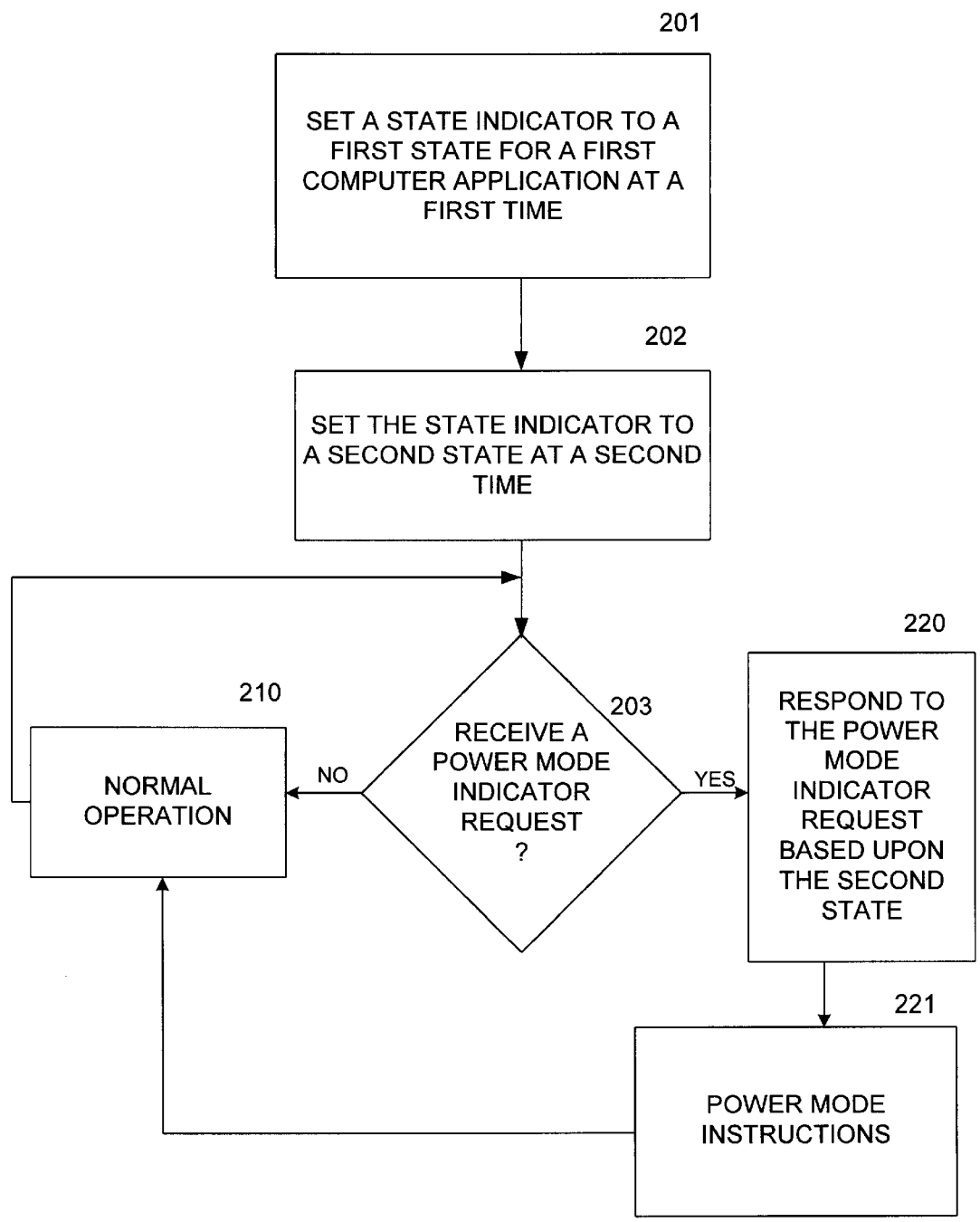
FIG. 2 illustrates a method in accordance with the present invention.

The invention is best understood with reference to the layers of code illustrated in FIG. 1, and the method of FIG. 2. At step 201 of FIG. 2 a state indicator associated with a specific application 110, is set to a specific state. For example, assuming application 110 of FIG. 1 is a Digital Video Disk (DVD) multimedia application capable of displaying DVD images, the DVD application can have a plurality of state indicators including a state for indicating the application is currently in a stop mode and/or a paused mode.

At step 202, the state indicator is set to a second state at a second period of time. Using the example of the multimedia DVD player application, the state indicator may be changed from indicating a stop mode to a play mode to indicate the application is playing video and/or audio stored upon the DVD.

At step 203, a determination is made whether or not a indication of a power management event, or a power mode indicator request has been received. If no request has been received, flow proceeds to step 210, and normal operation resumes. From step 210, the flow would proceed back to step 203 where a query continues to determine whether or not a power event management request has occurred. One of ordinary skill in the art will recognize that techniques other than querying techniques can be used to determine when a power mode request is received. For example, the step 203 can actually represent an interrupt driven step.

When a power management event or request has occurred, the flow proceeds to step 220. At step 220, the application will respond to the power mode indicator request based upon the second state. In other words, the first state associated with the DVD disk has no effect upon the response provided to the power mode indicator. Next, at step 221, specific power mode instructions can be executed prior returning to a normal flow prior to step 203. It should be understood that the power mode instructions of step 221 are optional and/or can be executed before step 220. However, where it would be desirable for the application to perform some events prior to returning to normal operation, the power mode instructions 221 can be used to implement such events. For example, the step 221 can be used to shut down or open files of the application.

The method of FIG. 2 represents an advantage over the prior art, in that it allows for specific responses to the power mode indicator to be based upon one of a plurality of possible application states. In the prior art, the responses were fixed, and were not based upon specific states associated with the application. Referring to FIG. 1, the power mode indicator 140 is received by the application 110, where the application 110, based upon its current state, will provide a response 150 to the operating system. It should be understood, that the operating system can interface with the application 110 through the API layer or directly.

Figure 3:
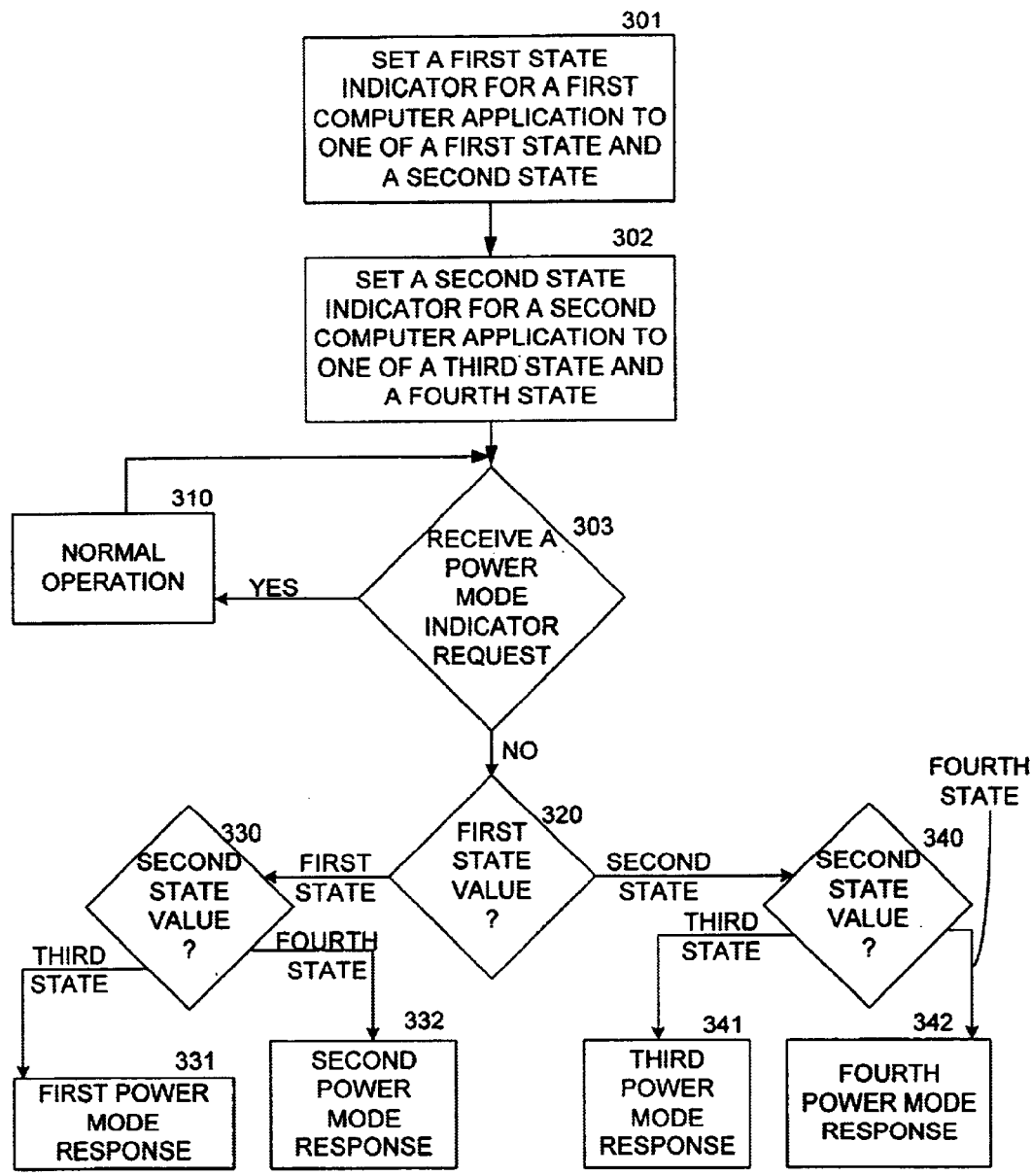
FIG. 3 illustrates a method in accordance with the present invention.

FIG. 3 illustrates another method in accordance with the present invention. At step 301, a first state indicator for a specific application is set to one of a first state and a second state. Referring to FIG. 1, application 110 is assumed to be a DVD application. The first state indicator of step 301 of FIG. 3 can be used to indicate whether or not the DVD application is currently in a stopped mode or a playback mode.

Next at step 302, a second state indicator associated with a second computer application is set to one of a third state and a fourth state. Referring to FIG. 1, the second computer application is the application 120. For illustration purposes, the application 120 is an application for providing an active video feed into a window associated with the application 120. In a specific embodiment, the second state indicator is for indicating whether or not the audio portion of application 120 is muted.

At step 303, a determination is made whether or not a specific power mode indicator request has been received. One example of a power mode indicator request would be a suspend O/S operation, which is a type of power mode indicator request indicating that the O/S wants to suspend operations, presumably to power down the system. If a power mode indicator request has not been received, the system continues in normal operation at step 310 and from 310 will continue to query whether or not a power mode indicator request has been received. In the event that a power mode indicator request has been received flow will continue to step 320. At step 320, a determination is made whether or not the first state indicator is in a first state or a second state. When the first state indicator is in a first state, for our example indicating that the application 110 is in a stop mode, the flow will proceed to step 330. One example of a first state for the DVD application is stop mode.

At step 330, a determination is made as to the state of the second state indicator. When the second state indicator indicates a third state, such as a mute operation, the flow will proceed to step 331. At step 331, a first power mode response is provided. For example, where the DVD application 110 is in a step mode, and the active video mode of application 120 is a mute mode, the power response of step 331 responds to the system that it is okay to suspend operation.

At step 330, when a determination s made that the application 120 is in a fourth state, such as an active video state whereby the video and associated audio is being played (i.e. not muted), the flow proceeds to step 332. At step 332, a second power mode response is provided to the system. For example, where the DVD application 110 is in a stop mode, and the video playback application 120 is playing active video, the response back to the system can either accept or reject the suspend request. In an alternative embodiment, it is possible for the step 332 to provide a dialog request box to the user asking the user whether or not the user wishes to suspend operation. If the user does not respond within a certain amount of time, an assumption can be made that it is okay to suspend the operation.

If at step 320, a determination is made that the DVD application 110 is currently in a second state, such as a playback mode, the flow proceeds to step 340. At step 340, a determination is made whether or not the second state indicator is in a third state or a fourth state. When in a third state, the flow proceeds to step 341. In a specific embodiment, the response to step 341 can be based upon the fact that the DVD application is in a play mode, while the active video application 120 is muted. This step can be handled in the same manner as step 332, or in a different manner. For example, a response can be such that it would allow the DVD playback to complete prior to responding to the O/S suspend request. If at step 340, it is determined that the second state indicator indicates a fourth state, the flow proceeds to step 342. In this mode, the DVD application 110 would be in a play mode, while the active video application 120 will also be in a play mode. Because multiple multimedia applications are currently active, a determination can be made to not allow the operation suspend request to occur. Or likewise, a determination could be made to allow the request to proceed.

Bi-directional arrow 130 of FIG. 1 represents a communication channel between applications 110 and 120 allowing each application to have visibility into the other application state. This visibility can be accomplished by transmitting specific state information from one application to another, possible through the API, or other system resources, to the other application in order for the other state to monitored as needed. By allowing for this type of, communication, it is possible to make power down decisions based upon states of more than one application.

It should be apparent that the method of FIG. 3 is advantageous over the prior art in that it allows for a variety responses to power management requests to be made. The specific responses of steps 331, 332, 341, and 342, can be predefined responses associated with the application, or they could be responses which are capable of being set within a user preference table. For example, a user preference table could be used to indicate how a particular user wants a DVD application to respond based upon power management requests. In this manner, it possible for one user to specify an application to respond in a specific manner, while another user would set it to respond in a different manner for the same event.

Figure 4:
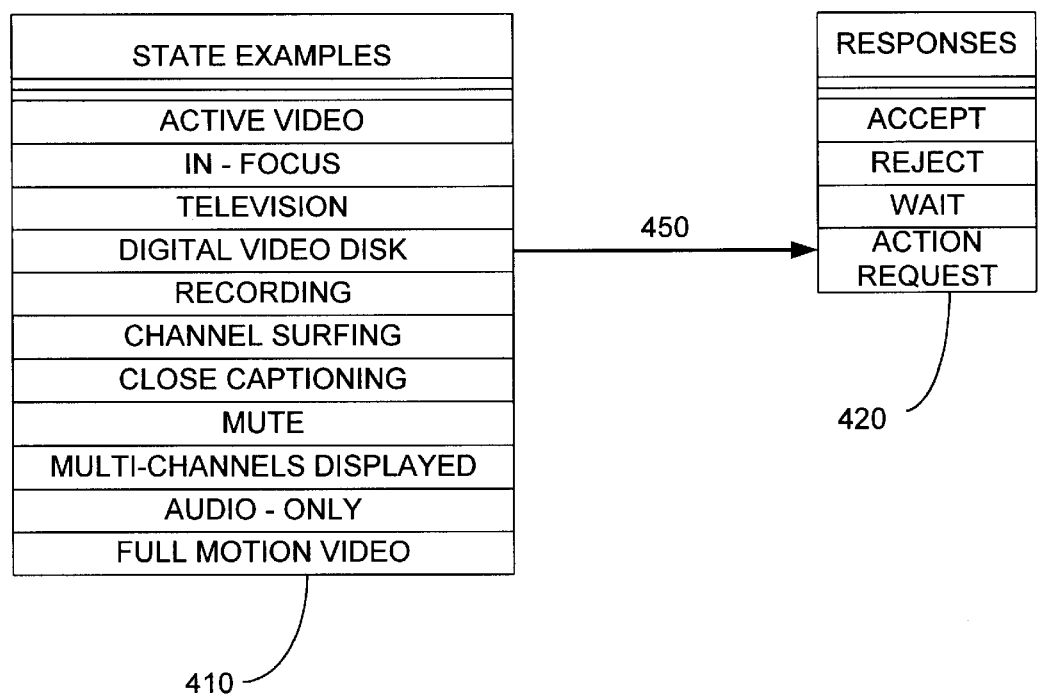
FIG. 4 illustrates a table of application and state examples and a table of responses.

FIG. 4 illustrates a table of state and application examples, and responses to specific power management requests. Examples of various applications in table 410 include full motion video applications, such as television, DVD, and VCRs. Possible states for theses and other applications include an in-focus state indicating whether or not a current application is actually the top window capable of being viewed by the user, a recording state, mute state, closed caption state, channel surfing state, and a multi-display state. Based upon the combinations of these and other states, it is possible to provide a response. Examples of possible responses are illustrated in table 420 of FIG. 4, which include an accept power mode request, reject power mode request, wait or delay power mode request, or perform some action.

Figure 5:
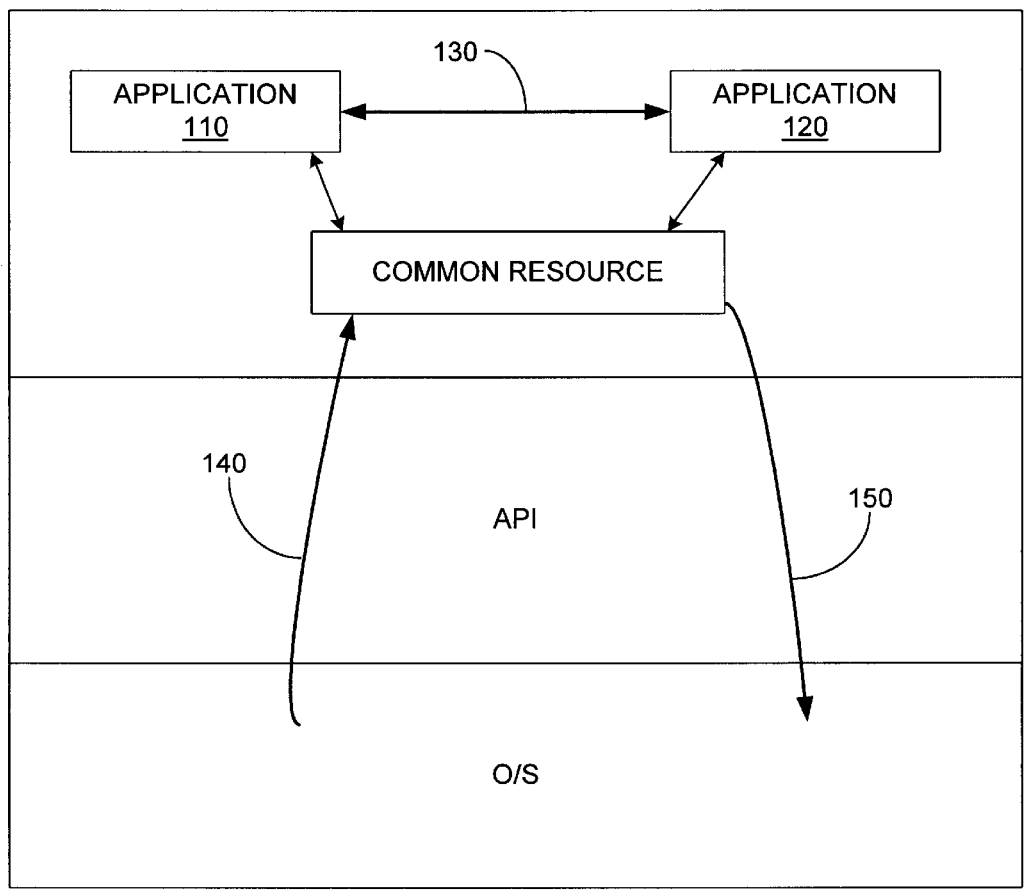
FIG. 5 illustrates a block diagram representing various layers of code typically stored within a memory associated with the computer system.

FIG. 5 illustrates another method of allowing visibility among applications. Specifically, FIG. 5 is representative of the layers of code of FIG. 1, however a common resource 505 has been provided at the application layer. The common resource 505 provides an application interface type layer between the O/S and the individual applications 110 and 120. In this manner, it is possible for the common resource 505 to maintain visibility as to the states of the applications 110 and 120. In a specific mode of operation, the applications 110 and 120 signal the common resource 505 when specific states have changed. In this manner, the O/S is allowed to send a single power mode indicator 140 to the common resource 505. By having the common resource 505 maintain the important state information of each of the applications, the common resource 505 can provide the response back to the operating system indicating how to proceed with the power mode request.

Figure 6:
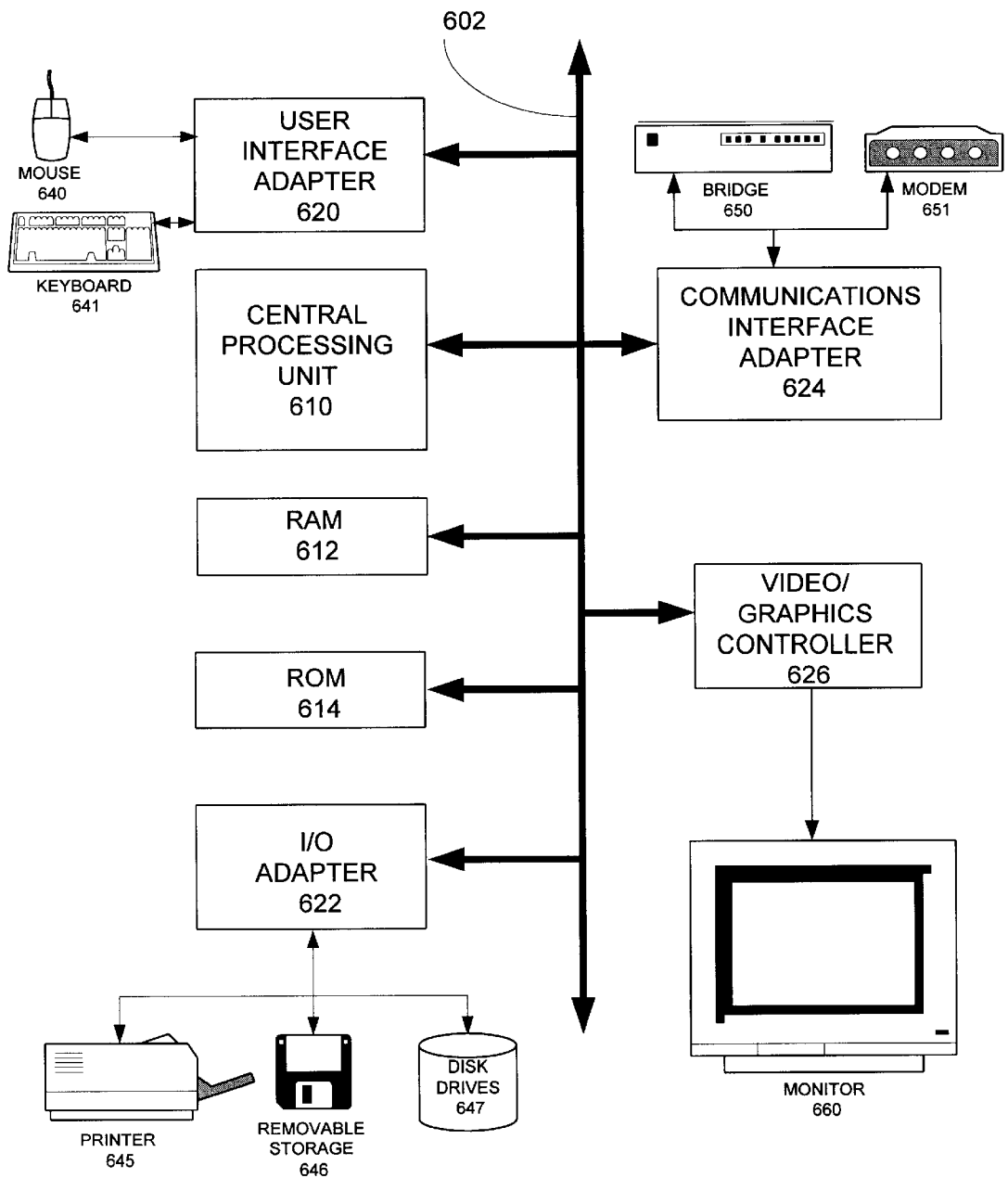
FIG. 6 illustrates a system capable of implementing the present invention.

FIG. 6 illustrates a computer system 600 capable of implementing the present invention. Specifically, FIG. 6 illustrates a data processing system 600, such as may be used to implement the present invention and can be used to implement the various methodologies or incorporate the various hardware disclosed herein. FIG. 6 illustrates a general purpose computer 600, that includes a central processing unit (CPU) 610, which may be a conventional or proprietary data processor, and a number of other units interconnected via system bus 602. The other portions of the general purpose computer include random access memory 612 read only memory 614, input output adapter 620 for connecting peripheral devices, the user interface adapter 620 for connecting user interface devices, a communication adapter 624 for connecting the system 600 to a data processor network, and a video graphic controller for displaying video and graphic information.

The IO adapter 622 is further connected to disk drives 647, printers 645, removable storage devices 646, and tape units (not shown) to bus 602. Other storage devices may also be interfaced to the bus 602 through the IO adapter 622. The user interface adapter 620 is connected to a keyboard device 641 and a mouse 640. Other user interface devices such as a touch screen device (not shown) may also be coupled to the system bus 602 through the user interface adapter 620.

The video/graphics controller 626 is connected to a display device 660. In addition, the video graphic controller 626 can be connected to a plurality of other multimedia devices, such as a DVD player, a VCR, a home stereo theater, as well as an array of audio processing devices. In addition, the video graphics controller 626 can be representative of a plurality of video graphics controllers.

In accordance with the present invention, the application programs described with reference to FIG. 1 and the methods described herein are generally stored within the disk drive 647, and executed from a RAM 612. In addition, the computer instructions capable of implementing the specific method embodiments described herein can be stored upon removable storage devices 646, on the disk drive 647, or stored on off-site locations and transmitted to the system 600 via the modem 651, or bridge 650 through the communications interface adapter 624.

When a data processor, such as microprocessor 610, for issuing instructions is used, the instructions may be stored in memory, such as the random access memory. Furthermore, when the data processor 610 implements one or more of its functions via state machine or logic circuitry, the memories having the corresponding instructions may be embedded within the circuitry comprising one of a state machine or other logic circuitry, or may be unnecessary because the function is performed using combinational logic.

And now it should be apparent that by allowing for individual applications to respond to low power management requests based upon their varying states, or based upon states of other applications is an advantage over the prior art in that more flexible power management can be achieved.

We claim:

1. A method for responding to a power mode, comprising the steps of:

setting a state indicator associated with a first plurality of computer instructions to a first state during a first period of time;

setting the state indicator of the first plurality of computer instructions to a second state during a second period of time;

setting a second state indicator of a second plurality of computer instructions to a third state;

receiving a power mode indicator;

executing a power mode instruction based on a response to the power mode indicator, wherein the response is, solely based upon the state indicators of the first and second plurality of computer instructions.

2. The method of claim 1, wherein the first plurality of computer instructions and the second plurality of computer instructions are associated with a first and second application respectively.

3. The method of claim 2, wherein the first and second applications share a common resource, wherein the common resource receives the power mode indicator.

4. The method of claim 1, wherein the step of executing the power mode instruction further includes the substeps of:

providing a first response when the state indicator of the first plurality of computer instructions is in the first state; and providing a second response when the state indicator of the second plurality of computer instructions is in the second state.

5. The method of claim 1, wherein the power mode indicator includes a suspend request.

6. The method of claim 1, wherein:

the step of setting a state indicator associated with a first plurality of computer instructions to a first state includes the first state being an in focus state; and the step of setting a state indicator associated with a first plurality of computer instructions to a second state includes the second state being an out-of-focus state.

7. The method of claim 1, wherein the step of receiving the power mode indicator includes receiving the power mode indicator at a resource common to the first plurality of instructions and the second plurality of instructions.

8. The method of claim 1, wherein the step of receiving the power mode indicator includes receiving the power mode indicator from a system resource.

9. A method of operation, comprising the steps of:

receiving a low power operation request;

executing a power mode instruction based, solely on a first state indicator indicating that a first application program is in a first mode and a second state indicator indicating that a second application program is in a second mode; and responding negatively to the low power operation request based on at least one of the following; solely the first state indicator indicating that the first application is in a second mode, and the first state indicator indicating that the first application is in a first mode and the second state indicator indicating that the second application program is in a second mode.

10. The method of claim 9, wherein one of the first mode and the second mode is an in-focus mode.

11. The method of claim 9, wherein one of the first mode and the second mode is a not-in-focus mode.

12. The method of claim 9, wherein the first mode and the second mode include modes of multi-media operation.

13. The method of claim 12, wherein one of the first mode and the second mode includes full motion video display.

14. The method of claim 13, wherein one of the first mode and the second mode is full screen video playback.

15. The method of claim 12, wherein one of the first mode and the second mode includes multi-picture video display.

16. The method of claim 12, wherein one of the first mode and the second mode includes a recording function.

17. A system for responding to a low power request, the system comprising:

a processing module; and memory operably coupled to the processing module, wherein the memory stores an application, including operational instructions that cause the processing module to:

receive a low power operation request;

execute a power mode instruction based, solely on a first state indicator indicating that a first application program is in a first mode and a second state indicator indicating that a second application program is in a second mode; and respond negatively to the low power operation request based on at least one of the following; solely the first state indicator indicating that the first application is in a second mode, and the first state indicator indicating that the first application is in a first mode and the second state indicator indicating that the second application program is in a second mode.

18. The system of claim 17, wherein the low-power request is a suspend request.

19. A data storage device for storing instructions to:

receive a low power operation request;

execute a power mode instruction based solely on a first state indicator indicating that a first application program is in a first mode and a second state indicator indicating that a second application program is in a second mode; and respond negatively to the low power operation request based on at least one of the following; solely the first state indicator indicating that the first application is in a second mode, and the first state indicator indicating that the first application is in a first mode and the second state indicator indicating that the second application program is in a second mode.

* * * * *